United States Patent [19]

Peiffer et al.

[11] Patent Number: 5,716,570
[45] Date of Patent: Feb. 10, 1998

[54] PROCESS FOR THE PRODUCTION OF POLYPROPYLENE FILMS

[75] Inventors: Herbert Peiffer, Mainz; Gunter Schlögl, Kelkheim; Karl-Heinz Kochem, Bingen; Detlef Busch, Saarlouis; Robert Schmidt, Homburg, all of Germany

[73] Assignee: Hoechst Aktiengesellschaft, Germany

[21] Appl. No.: 641,637

[22] Filed: May 2, 1996

[30] Foreign Application Priority Data

May 2, 1995 [DE] Germany ............... 195 15 599.8

[51] Int. Cl.$^6$ ............... B29C 47/06; B29C 47/16; B29C 55/14
[52] U.S. Cl. ............... 264/146; 264/173.19; 264/210.6; 264/290.2
[58] Field of Search ............... 264/146, 173.19, 264/210.5, 210.6, 235.8, 290.2, 469

[56] References Cited

U.S. PATENT DOCUMENTS

| | | | |
|---|---|---|---|
| 4,348,346 | 9/1982 | Thompson | 264/146 |
| 4,521,359 | 6/1985 | Tsien | 264/104 |
| 4,975,329 | 12/1990 | Bothe et al. | 428/461 |
| 5,252,389 | 10/1993 | Schmidt et al. | 428/334 |

*Primary Examiner*—Leo B. Tentoni
*Attorney, Agent, or Firm*—Connolly & Hutz

[57] ABSTRACT

A process for the production of biaxially oriented polypropylene films which include at least one layer is described, in which a propylene polymer B is heated in an extruder and the melt of the propylene polymer B is extruded through a flat sheet die and the melt emerging from the flat sheet die is taken off on one or more rolls and is solidified to give a prefilm and this prefilm is stretched in the longitudinal and transverse direction. A propylene polymer or a propylene polymer mixture A is heated and melted in a second extruder and the melt of the propylene polymer or of the propylene polymer mixture A is fed to the two sides of the propylene polymer melt B so that both melts are extruded together and simultaneously through the flat sheet die. The propylene polymer or the propylene polymer mixture A forms the edge region of the film during the production process, and the edge regions including the propylene polymer or the propylene polymer mixture A are cut off after the longitudinal and transverse stretching of the film.

23 Claims, 4 Drawing Sheets

PROCESS FOR THE PRODUCTION OF POLYPROPYLENE FILMS

BACKGROUND OF THE INVENTION

The present invention relates to a process for the production of biaxially oriented polypropylene films which comprise at least one layer, and their use.

Owing to their good performance characteristics, bi-axially oriented polypropylene films (boPP films) are used for many different packaging applications. These good performance characteristics are, for example, high mechanical strengths, good dimensional stability and high gloss. In addition to the use as packaging films, boPP films are used in considerable amounts in industrial applications. Metallization and transfer metallization, lamination and use as electrical insulation film in capacitor production may be mentioned.

Various processes for the production of biaxially oriented polypropylene films are known in the prior art. In the so-called stenter process, the boPP film is produced by extrusion, shaping in a flat sheet die and stretching in the longitudinal and transverse direction.

In this process, specifically, the propylene polymers are compressed, heated and melted in an extruder, the melts corresponding to the individual layers of the film are then extruded through a flat sheet die, the film thus obtained is taken off on one or more rolls for solidification, and the film is oriented and then heat-set. Finally, the machine roll thus produced is made up into the customer-ready cut roll.

In this production of biaxially oriented films, the process itself gives rise to a large amount of film trimming waste, for example as a result of the so-called cutoff edge. Cutoff edges are film edges which are gripped by the clips of the transverse stenter but are not stretched. After orientation, the unstretched edge is substantially thicker than the film and must therefore be cut off. Depending on the film and on the machine width, the material loss due to the cutoff edge may be up to 25% by weight. For economic reasons, it is necessary for the cutoff edge, together with the other film trimming waste produced during makeup, on tearing or during startup and shutdown of the machine, to be processed to regranulated material and added again to the original raw material.

In some applications having particularly high quality requirements, such reutilization of film trimming waste With the original raw material is not possible. This is true, for example, in the production of electrical insulation films which are used in the production of capacitors. For these applications, special film properties, such as, for example, a low dielectric loss factor, a high specific insulation resistance, a high DC and AC dielectric strength and as small a number of defects as possible, are required. These properties are achieved, inter alia, by the use of a particularly pure polypropylene having a low ash and chlorine content. In addition, the polymers must have no ionic components. It has been found that these high quality requirements are no longer met by the addition of film trimming waste to the highly pure raw material. This means that, in the production of electrical films, the film trimming waste is in fact waste which can be used only in low-quality applications, for example in the production of packaging films or in injection molding. Consequently, the economic losses through film trimming waste in the production of electrical films is particularly pronounced.

SUMMARY OF THE INVENTION

The object of the present invention was therefore to provide a process for the production of films comprising high-quality, i.e. pure, polypropylene, which avoids the disadvantages described above. The process should in particular reduce the economic losses due to film trimming wastes which cannot be reused.

This object is achieved by a process of the generic type stated at the outset, in which a propylene polymer B is heated in an extruder and the melt of the propylene polymer B is extruded through a flat sheet die and the melt emerging from the flat sheet die is taken off on one or more rolls and is solidified to give a prefilm, and this prefilm is stretched in the longitudinal and transverse directions, wherein 1. a propylene polymer or a propylene polymer mixture A is heated and melted in a second extruder and
2. the melt of the propylene polymer or of the propylene polymer mixture A is fed to the two sides of the propylene polymer melt B in such a way that the two melts are extruded together and simultaneously through the flat sheet die, and the propylene polymer or the propylene polymer mixture A forms the edge region of the film during the production process, and
3. the edge regions comprising the propylene polymer or the propylene polymer mixture A are cut off after the longitudinal and transverse stretching of the film.

DETAILED DESCRIPTION OF THE INVENTION

According to the invention, the propylene polymers or the corresponding mixtures differ with respect to their residual ash and chlorine content, which is why they are referred to as polymers B and A. The residual ash content and the chlorine content of the propylene polymer A are generally at least twice as large, preferably at least three times as large, in particular at least five times as large, as the residual ash content of the propylene polymer B. This means that the propylene polymer B is a higher-quality and hence more expensive polymer than the propylene polymer A.

The propylene polymer B is a highly pure polymer. For the purposes of the present invention, this means that the residual ash content of the propylene polymer B is less than or equal to 70 ppm, preferably $\leq 50$ ppm, in particular $\leq 40$ ppm, and the chlorine content is less than or equal to 50 ppm, preferably $\leq 20$ ppm.

The propylene polymer B contains in general from 90 to 100% by weight, preferably from 95 to 100% by weight, in particular from 98 to 100% by weight, of propylene units, based on the weight of the polymer. In general, the polypropylene B has a melting point of 130° C. or higher, preferably from 140° to 170° C., and a melt flow index of from 0.5 g/10 min to 10 g/10 min, preferably from 0.8 g/10 min to 5 g/10 min, measured at 230° C. and a force of 21.6N (DIN 53 735).

Particularly suitable propylene polymers B have an average molecular weight $M_w$ in the range from 150,000 to 400,000, preferably from 180,000 to 350,000. The molecular weight distribution may vary within wide limits, and $M_w/M_n$ is in general from 2 to 15, preferably from 2 to 6, in particular from 3 to 6.

Among the propylene polymers B described above, isotactic propylene homopolymer having an n-heptane-soluble fraction of from 1 to 15% by weight, preferably from 1 to 10% by weight, and having a chain isotaxy index of the n-heptane-insoluble fraction of $\geq 85\%$, preferably $\geq 90\%$, is particularly preferred. Furthermore, copolymers of ethylene and propylene having an ethylene content of 10% by weight or less, copolymers of propylene with $C_4$–$C_6$-olefins having an olefin content of 10% by weight or less, and terpolymers of propylene, ethylene and butylene having an ethylene content of 10% by weight or less and having a butylene content of 15% by weight or less are suitable. The stated percentages by weight are based on the respective propylene polymer B.

In order to improve certain properties of the polypropylene film according to the invention, in general stabilizers and/or neutralizing agents and, if required, nucleating agents are added to the propylene polymer B. With regard to the desired electrical properties of the film, in a preferred embodiment no antistatic agent and no lubricant should be added to the propylene polymer B, since these additives adversely affect the electrical properties of the film. All amounts stated below in % by weight are each based on the layer or layers to which the additive may have been added.

The stabilizers used may be the usual stabilizing compounds for ethylene, propylene and other α-olefin polymers. The amount thereof which is added is between 0.05 and 2% by weight. Phenolic stabilizers, alkali metal/alkaline earth metal stearates and/or alkali metal/alkaline earth metal carbonates are particularly suitable. Phenolic stabilizers are preferred in an amount from 0.1 to 0.6% by weight, in particular from 0.15 to 0.3% by weight, and with a molecular weight of more than 500 g/mol. Pentaerythrityl tetrakis-3-(3,5-di-tert-butyl-4-hydroxphenyl)propionate and 1,3,5-trimethyl-2,4,6-tris(3,5-di-tert-butyl-4-hydroxybenzyl)benzene are particularly advantageous.

Neutralizing agents are preferably calcium stearate and/or calcium carbonate having a mean particle size of not more than 0.7 μm, an absolute particle size of less than 10 μm and a specific surface area of at least 40 m²/g. In general, the neutralizing agent is added in an amount of from 0.02 to 0.5% by weight.

Nucleating agents may be organic substances, preferably dibenzylidenesorbitol or chemically modified derivatives of dibenzylidenesorbitol or sodium bis(4-tert-butyl-phenyl)phosphate. Further nucleating agents which may be used are, for example, metal salts of benzoic acid, preferably sodium benzoate, and quinacridone and quinacridone derivatives. Inorganic nucleating agents, such as, for example, talc, silica or bentonite, are also suitable. Here, an extremely fine distribution of the nucleating agent is particularly important, i.e. the mean particle size is not more than 1 μm, preferably not more than 0.7 μm.

According to the invention, the propylene polymer A differs from the propylene polymer B with regard to its residual ash content. As explained above, it is not a highly pure polymer. The residual ash content of the propylene polymer A is in general in the range from 50 to 800 ppm, preferably from 100 to 600 ppm, in particular from 200 to 500 ppm. The chlorine content is from 20 to 100 ppm, preferably from 30 to 70 ppm.

The propylene polymer A contains in general from 90 to 100% by weight, preferably from 95 to 100% by weight, in particular from 98 to 100% by weight, of propylene units, based on the weight of the polymer. In general, the propylene polymer A has a melting point of 130° C. or higher, preferably from 140° to 170° C., and a melt flow index of from 0.3 g/10 min to 15 g/10 min, measured at 230° C. and a force of 21.6N (DIN 53 735).

Particularly suitable propylene polymers A have an average molecular weight $M_w$ in the range from 150,000 to 400,000, preferably from 180,000 to 350,000. The molecular weight distribution of the preferred propylene polymers A may vary within wide limits. $M_w/M_n$ is in general from 2 to 15, preferably from 2 to 6, in particular from 3 to 5.

The preferred narrow molecular weight distributions can be achieved, for example, by peroxidic degradation of the propylene polymer A. A measure of the degree of degradation is the so-called degradation factor A, which gives the relative change in the melt flow index according to DIN 53 735 of the polypropylene, based on the starting polymer.

$$A = \frac{MFI_2}{MFI_1}$$

$MFI_1$=Melt flow index of the propylene polymer before the addition of the organic peroxide $MFI_2$=Melt flow index of the peroxidically degraded propylene polymer The degradation factor of the propylene polymer A is from 3 to 15, preferably from 6 to 10. The peroxidic degradation is advantageously effected by the addition of organic peroxides. Particularly preferred organic peroxides are dialkyl peroxides, an alkyl radical being understood as meaning the usual saturated, straight-chain or branched lower alkyl radicals having up to six carbon atoms, 2,5-dimethyl-2,5-di(tert-butylperoxy)hexane and di-tert-butyl peroxide being particularly preferred.

Among the propylene polymers A described above, isotactic propylene homopolymer having an n-heptane-soluble fraction of from 1 to 15% by weight, preferably from 1 to 10% by weight, and having a chain isotaxy index of the n-heptane-insoluble fraction of $\geq 85\%$, preferably $\geq 90\%$, is particularly preferred. Furthermore, copolymers of ethylene and propylene having an ethylene content of 10% by weight or less, copolymers of propylene with $C_4$–$C_8$-olefins having an olefin content of 10% by weight or less, and terpolymers of propylene, ethylene and butylene having an ethylene content of 10% by weight or less and having a butylene content of 15% by weight or less are suitable. The stated percentages by weight are based on the respective propylene polymer.

A mixture of the stated propylene homopolymers and/or propylene copolymers and/or propylene terpolymers and other polyolefins is also suitable. The mixture contains at least 50% by weight, in particular at least 75% by weight, of the propylene polymer A described above. Suitable other polyolefins in the propylene polymer mixture are, for example, polyethylenes, the amount of these polyolefins being in the range from 5 to 60% by weight, preferably from 10 to 40% by weight, based on the propylene polymer mixture A.

If required, additives in an effective amount in each case may be added to the propylene polymer A or the propylene polymer mixture A, preferred additives being neutralizing agents and/or stabilizers. If necessary, antistatic agents and/or lubricants may also be present. However, it is preferable to add no such additives capable of migration, since these may soil the frame and other parts of the production plant through devolatilization. These impurities become detached from the frame and may drop down onto the film.

The type and amount of neutralizing agents and stabilizers were described above for the propylene polymer B. These data are applicable in a similar manner to the propylene polymer A.

It was found that the edge regions, i.e. the cutoff edges, comprising the propylene polymer A are particularly firmly connected to the actual film comprising the propylene polymer B if the melting points of the two polymers are of about the same magnitude, i.e. they should advantageously differ by not more than 15° C., preferably by not more than 10° C., or should be of about the same magnitude. Furthermore, the melt flow indices (MFI) of the two raw materials should in general be matched with one another so that the cutoff edges and the film are particularly firmly connected to one another. The MFI of the propylene polymer A should preferably be not more than three times the MFI of the propylene polymer B. If required, the melt flow indices of the two polymers may be of the same magnitude, or the MFI of the propylene polymer A may be slightly less than that of the propylene polymer B.

It was found that, at a constant die setting, the thickness of the film edge can be varied or adjusted in a controlled manner via the MFI of the polymer A without the thickness of the film itself changing. The greater the MFI of the polymer A in relation to the MFI of the polymer B, the thicker is the edge region, and vice versa. In this way, it is possible to optimize the cutoff edge thickness independently of the film to be produced. This is particularly advantageous in the production of very thin films. Here, in the conventional process, the die must be opened comparatively very widely in the edge region in order to ensure that the cutoff edge is sufficiently thick. This gives rise to the danger that the die lips will be irreversibly bent. In the process according to the invention, such extreme die settings are no longer necessary in the production of very thin films.

One-layer or multilayer films can be produced by the process according to the invention. Multilayer polypropylene films comprise at least one outer layer or layers, if necessary on both sides, which contains or contain in general from 75 to 100% by weight, preferably from 90 to 99.5% by weight, based in each case on the weight of the outer layer, of polymers of olefins having 2 to 10 carbon atoms.

Examples of such olefinic polymers are a propylene homoplymer or a copolymer of
  ethylene and propylene or
  ethylene and 1-butylene or
  propylene and 1-butylene or a terpolymer of
  ethylene and propylene and 1-butylene or a mixture of two or more of the stated homo-, co- and terpolymers or a blend of two or more of the stated homo-, co- and terpolymers, if necessary mixed with one or more of the stated homo-, co- and terpolymers, propylene homopolymer or random ethylene/propylene copolymers having an ethylene content of from 1 to 10% by weight, preferably from 2.5 to 8% by weight, or random propylene/1-butylene copolymers having a butylene content of from 2 to 25% by weight, preferably from 4 to 20% by weight, based in each case on the total weight of the copolymer, or random ethylene/propylene/1-butylene terpolymers having an ethylene content of from 1 to 10% by weight, preferably from 2 to 6% by weight, and a 1-butylene content of from 2 to 20% by weight, preferably from 4 to 20% by weight, based in each case on the total weight of the terpolymer, or a blend of an ethylene/propylene/1-butylene terpolymer and a propylene/1-butylene copolymer
  having an ethylene content of from 0.1 to 7% by weight
  and a propylene content of from 50 to 90% by weight
  and a 1-butylene content of from 10 to 40% by weight,
  based in each case on the total weight of the polymer blend, being particularly preferred.

The propylene homopolymer used in the outer layer contains a predominant part (at least 90%) of propylene and has a melting point of 140° C. or higher, preferably from 150° to 170° C., isotactic homopolypropylene having an n-heptane-insoluble fraction of 6% by weight or less, based on the isotactic homopolypropylene, being preferred. The homopolymer generally has a melt flow index of from 1.0 g/10 min to 20 g/10 min, preferably from 2.0 g/10 min to 15 g/10 min.

The copolymers, terpolymers and blends of co- and terpolymers, which are described above and used in the outer layer, generally have a melt flow index of from 1.5 to 30 g/10 min, preferably from 3 to 15 g/10 min. The melting point is in the range from 120° to 150° C. The melt flow index stated above is measured at 230° C. and a force of 21.6N (DIN 53 735).

If necessary, all outer layer polymers described above may be peroxidically degraded in the same manner as described above for the base layer. The degradation factor for the outer layer polymers is in general in the range from 3 to 15, preferably from 6 to 10.

Multilayer embodiments of films which are produced by the process according to the invention comprise at least one base layer, which essentially comprises the highly pure propylene polymer B, and the outer layer described above. The base layer may also have outer layers on both sides and, if required, additional interlayers. For the purposes of the present invention, the base layer is that layer which accounts for from more than 50 to 100%, preferably from 70 to 95%, of the total film thickness. The outer layer is the layer which forms the outermost layer of the film.

The total thickness of the films which can be produced by the process according to the invention may vary within wide limits and depends on the intended use. Preferred embodiments of the film have total thicknesses of from 2 to 100 µm, from 2 to 50 µm, in particular from 2 to 20 µm, being preferred. The thickness of any interlayer or interlayers present is from 0.5 to 15 µm, interlayer thicknesses of from 1 to 10 µm, in particular from 2 to 8 µm, being preferred. The thickness of the outer layer or layers is chosen independently of other layers and is preferably in the range from 0.1 to 10 µm, in particular from 0.2 to 5 µm, preferably from 0.3 to 2 µm, and outer layers applied on both sides may be identical different with regard to thickness and composition. The thickness of the base layer is accordingly obtained from the difference between the total thickness of the film and the thickness of the applied outer layer or layers and interlayer or interlayers and can therefore vary analogously to the total thickness.

In the process according to the invention, the propylene polymer B is first compressed, heated and melted in a main extruder (EXTR. 1). In a second extruder (EXTR. 2), the propylene polymer or the propylene polymer mixture A is also compressed, heated and melted. The melt of the propylene polymer or of the propylene polymer mixture A is fed to the two sides of the propylene polymer melt B in such a way that the two melts are extruded together and simultaneously through the flat sheet die, and the propylene polymer or the propylene polymer mixture A forms the edge region of the film during the production process. The polymer melt A can be fed to the edge of the melt B, for example as shown in FIG. 3, by means of a coextrusion adapter rotated through 90°.

Figure 2:
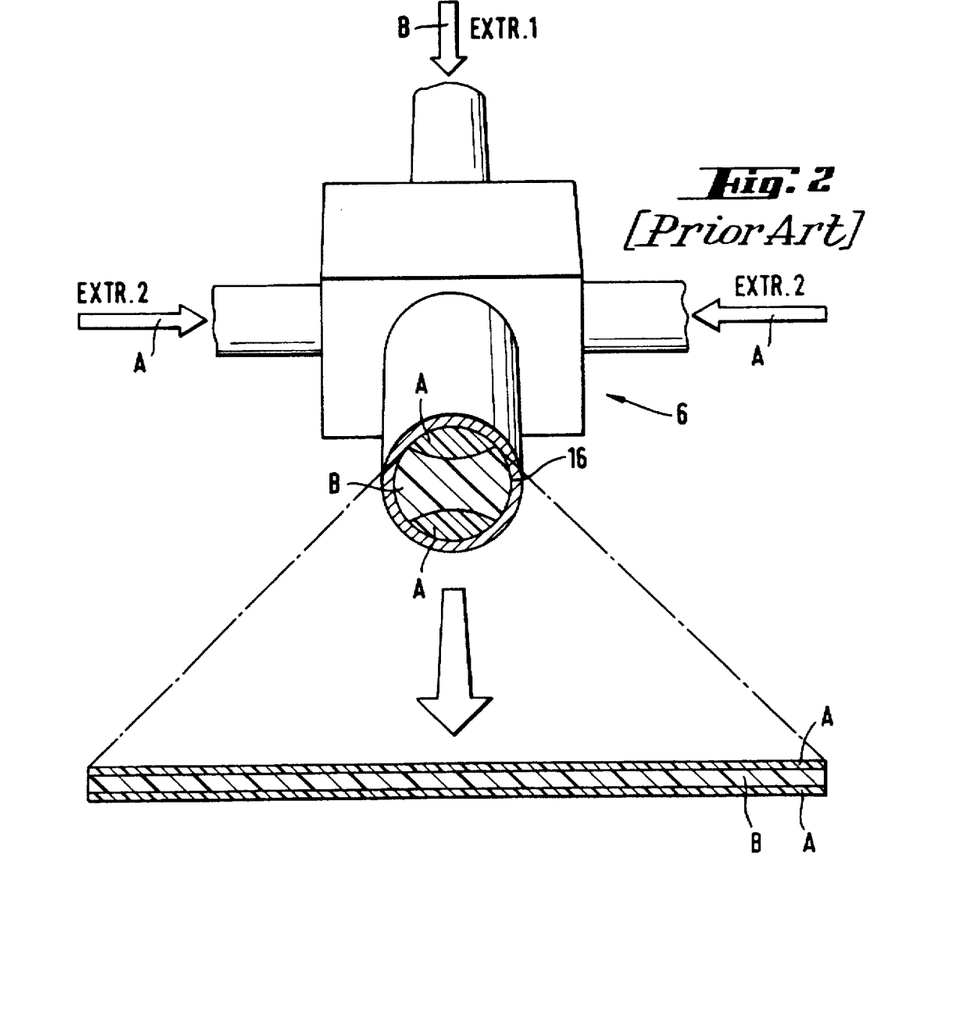
FIG. 2 shows a conventional adapter for producing a coextruded three-layer film.

FIG. 2 shows, for comparison, the conventional use of the standard adapter for the production of a coextruded three-layer film. The polymer melts are fed analogously via two extruders (EXTR. 1 and EXTR. 2).

The melt flows are placed one on top of the other as shown (16). In the die, the three-layer melt is shaped to give the multilayer film (ABA).

Figure 3:
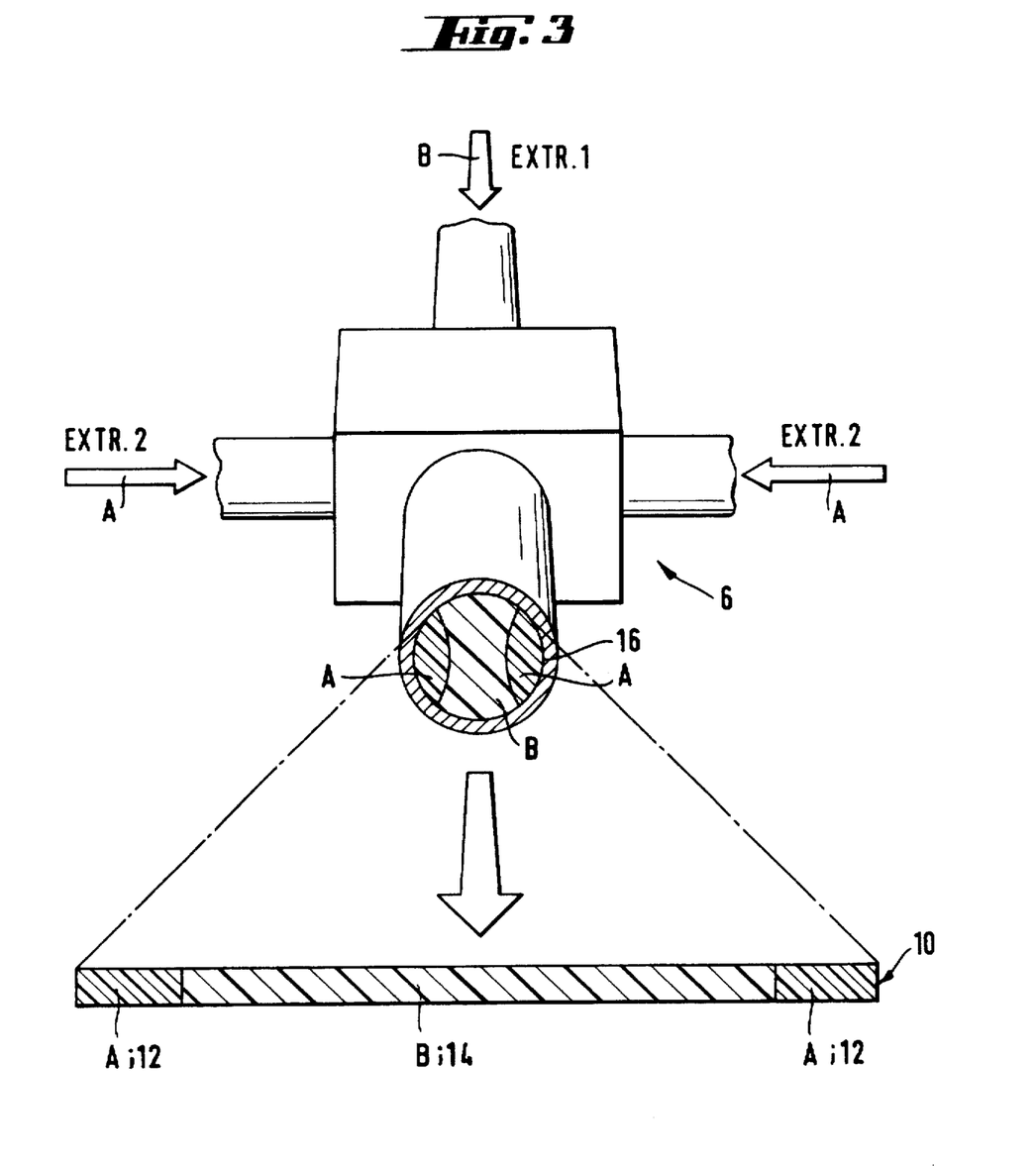
FIGS. 3 and 3A show a coextrusion adapter in the process according to the invention.
Figure 3A:
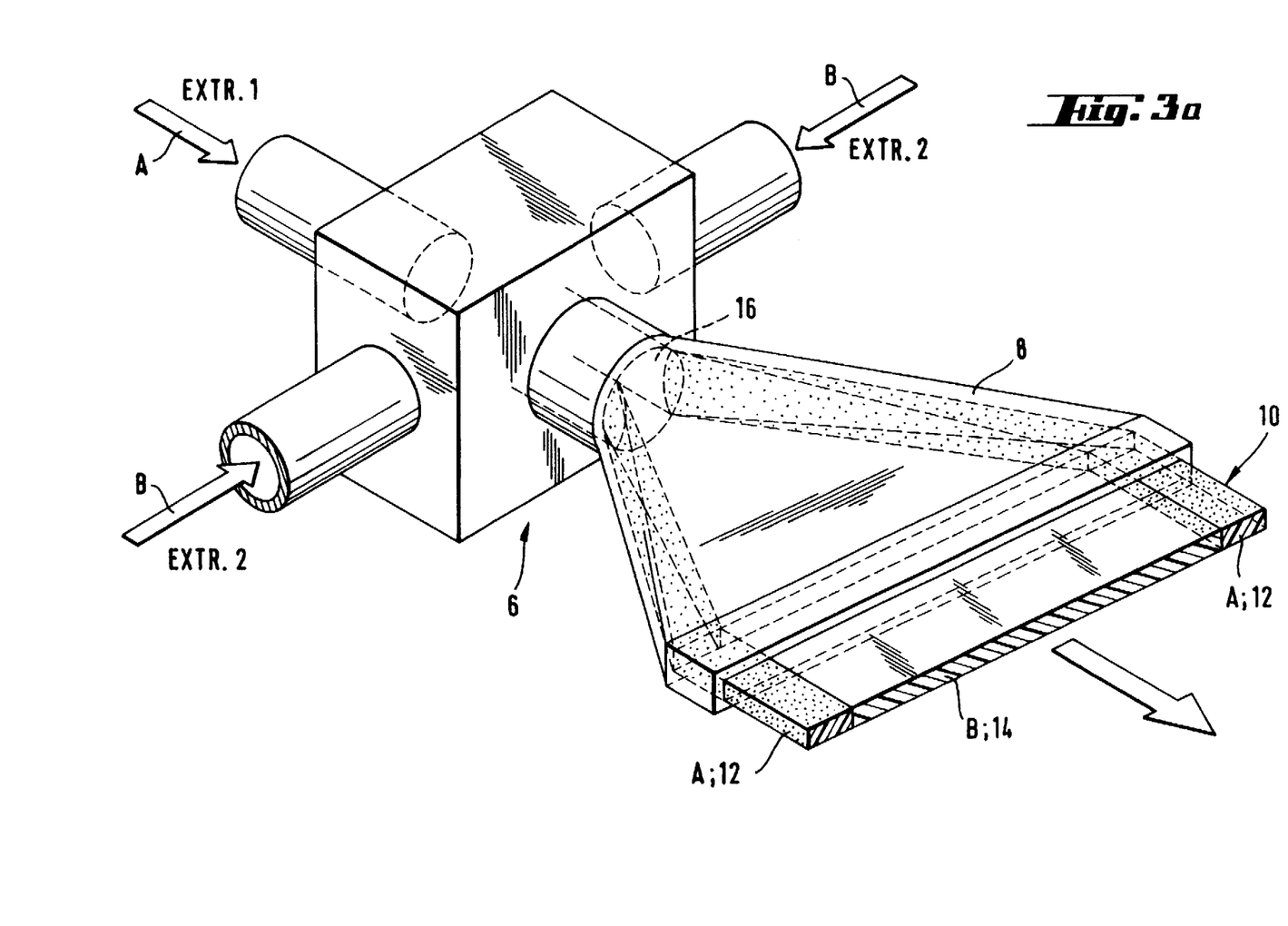

In contrast, FIG. 3 and 3A shows the use of the co-extrusion adapter 6 in an arrangement rotated through 90° (90° relative to FIG. 2) in the process according to the invention. The compression, heating and melting of the polymers and the feed of the melt flows A, B are carried out analogously. However, the melt flows A,B are placed side by side as shown (16). In the flat sheet die 8 the melts placed side by side are shaped into a film 10 whose edge regions (12) are composed of the polymer A (from the melt flow of extruder 2). The actual film (14) comprises the polymer B (from the melt flow of extruder 1).

Figure 4A:
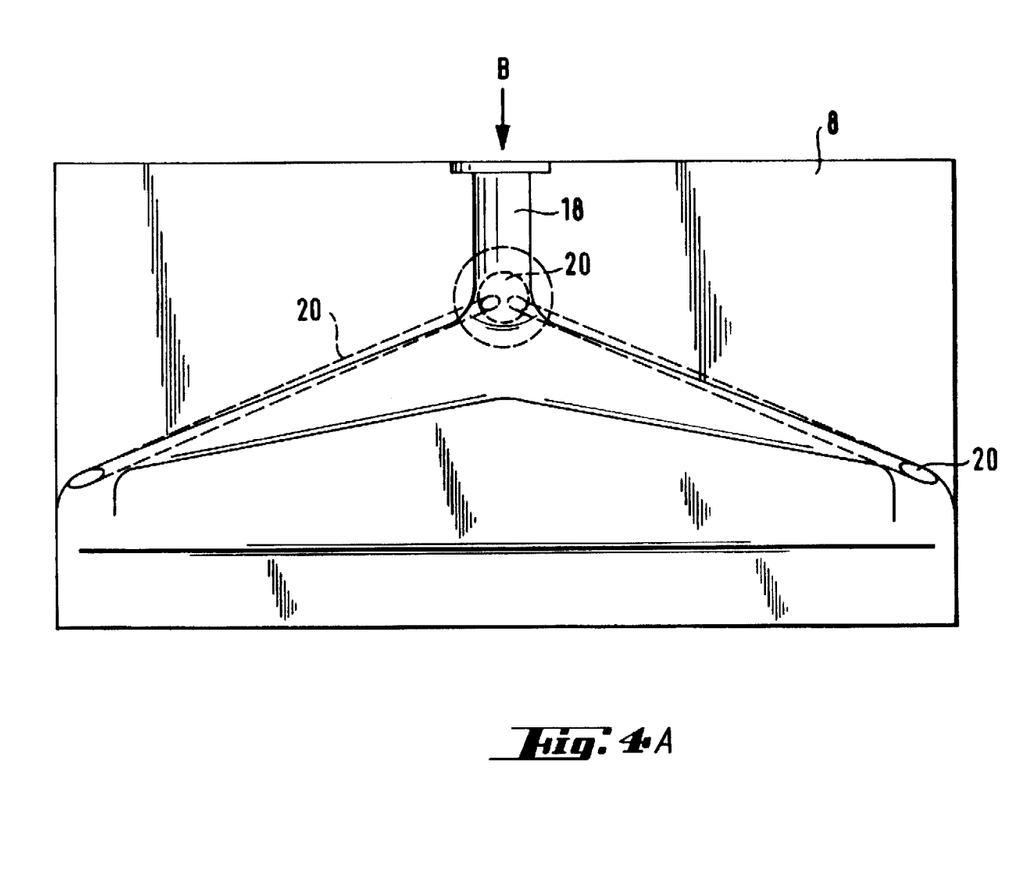
FIGS. 4A and 4B show an eyelet die.
Figure 4B:
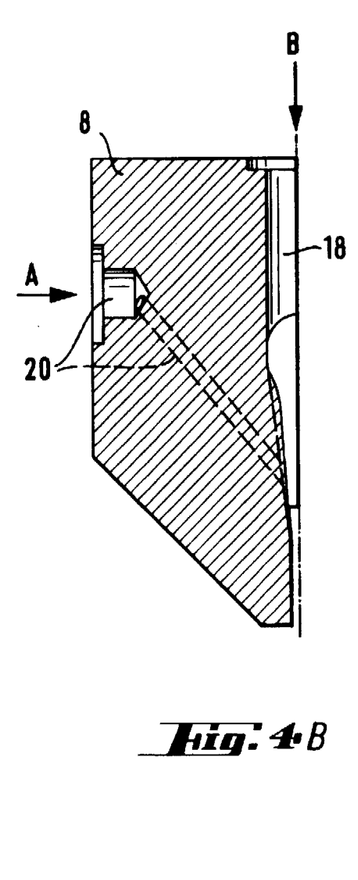

A monodie in which the melt A is injected laterally (so-called eyelet die) is also suitable for the process according to the invention. The basic structure of an eyelet die is shown in FIG. 4A and 4B. The flat sheet die 8 has one bore 20 each on the left and right of the main channel 118. The melt B is fed through the main channel 18 in the middle part of the die. The melt A flows through the bores 20 into the two edge regions of the die. In this way, the melts A and B are shaped side by side into a film whose edge regions comprise the polymer A.

The film thus extruded is taken off on one or more rolls for solidification. It has proven particularly advantageous to keep the take-off roll or rolls, by means of which the extruded film is solidified, at a temperature of at least 70° C., preferably from 80° to 120° C.

The prefilm thus obtained is stretched longitudinally and transversely to the extrusion direction, which leads to biaxial orientation of the molecular chains. The biaxial orientation is carried out in succession, stretching preferably being effected first longitudinally (in the machine direction) and then transversely (at right angles to the machine direction). The longitudinal stretching ratio is preferably from 4:1 to 9:1, in particular from 5.5:1 to 8.5:1, and the transverse stretching ratio is preferably from 6:1 to 11:1. The longitudinal stretching is expediently carried out with the aid of two rolls which run at different speeds depending on the desired stretching ratio, and the transverse stretching is carried out with the aid of an appropriate stenter frame.

Figure 1:
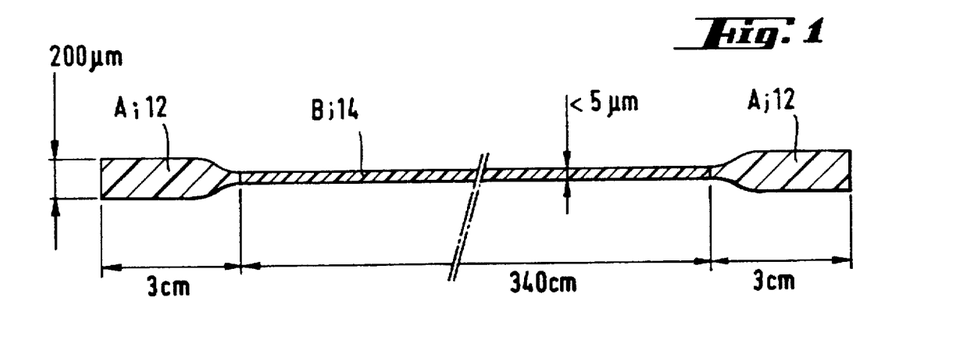
FIG. 1 is a schematic diagram of a biaxially-oriented polypropylene film.

The clips grip the edge region of the film so that essentially only the polymer B is stretched to give a thin film (14) and the edges (12) comprising the polymer A remain unstretched and thick. A corresponding schematic diagram is shown in FIG. 1.

The temperatures at which the longitudinal stretching and the transverse stretching are carried out may vary within a wide range and depend on the respective composition of the layers and on the desired properties of the film. In general, the longitudinal stretching is carried out at from 80° to 160° C., preferably from 100° to 160° C., and the transverse stretching at from 120° to 170° C., preferably from 130° to 160° C.

The biaxial stretching of the film is followed by heat setting (heat treatment) thereof, the film being kept for from about 0.1 to 10 s at a temperature of from about 100° to 160° C., preferably from 110° to 130° C.

As mentioned above, after biaxial stretching one surface or both surfaces of the film is or are corona-treated or flame-treated by one of the known methods. The treatment intensities are within the usual limits, from 35 to 50 mN/m, in particular from 36 to 45 mN/m, being preferred.

For the alternative corona treatment, the film is passed between two conductor elements serving as electrodes, the voltage, generally AC voltage (about 10,000 V and 10,000 Hz), applied between the electrodes being so high that spray or corona discharges can take place. As a result of the spray or corona discharge, the air above the film surface is ionized and reacts with the molecules of the film surface so that polar intercalations form in the essentially nonpolar matrix.

After the surface treatment or after the heat setting, the film is trimmed with the usual cutting apparatuses, and the film itself is wound by a winding means known per se. In general, the width of the edge to be cut off is up to 300 mm, preferably from 100 to 200 mm, and comprises at least 30% by weight, preferably from 50 to 100% by weight, in particular from 70 to 90% by weight, of the propylene polymer A. In conventional production processes, the film edge has a thickness of up to 200 µm, in general from 20 to 100 µm, preferably from 20 to 50 µm. Depending on the circumstances, edge thicknesses greater than or less than this may also be suitable. Expediently, the total cutoff (trimmed) edge regions are chopped and granulated and can then be used as regranulated material in the production of packaging film. By a suitable choice of the edge polymer A, it is possible to tailor the regranulated material subsequently to be reused specifically to this intended use. This was not possible in the conventional processes.

The invention is now illustrated in more detail with reference to embodiments:

EXAMPLE 1

A transparent film having a thickness of 6 µm was produced by coextrusion and by subsequent stepwise orientation in the longitudinal direction and transverse direction. The film produced has one layer. The adapter technique was used for the production of the "cutoff edge-film-cutoff edge" melts located side by side. The conventional adapter arrangement is rotated through 90°.

A original polymer:

100% by weight of isotactic polypropylene from Borealis, having the trade name ®B 2142 E, melt flow index=2.2 g/10 min B cutoff edge polymer:

100% by weight of isotactic polypropylene from Hoechst, having the trade name ®Hostalen PPN 1060, melt flow index=3.0 g/10 min.

The production conditions in the individual process steps are:

| Extrusion: | Temperature: | |
| --- | --- | --- |
| | A layer | 200° C. |
| | B layers | 280° C. |
| | Temperatures of the take-off roll | 90° C. |
| Longitudinal | Temperature | 150° C. |
| stretching: | Longitudinal stretching ratio | 5.5 |
| Transverse | Temperature | 160° C. |

| stretching: | Transverse stretching ratio | 9.5 |
| --- | --- | --- |
| Heat setting: | Temperature | 140° C. |
| | Convergence | 15% |

EXAMPLE 2

In comparison to Example 1, the arrangement and shaping of the melts were carried out by means of a so-called eyelet die (cf. FIG. 4A and 4B).

The following methods of measurement were used for characterizing the raw materials and films:

Melt flow index:

The melt flow index was measured similarly to DIN 53 735 at 21.6N load and 230° C.

Melting point:

DSC measurement, maximum of the melting curve, heating rate 20° C./min.

Crystallinity:

The crystallinity was determined with the aid of X-ray diffraction methods. Here, the corrected diffracted X-ray intensities were proportional to the fractions of amorphous and crystalline phases.

Glass transition temperature:

The samples were investigated with the aid of DSC (Differential Scanning Calorimetry). The heating rate was 20 K/min. In order to eliminate the thermal history of the sample, the sample was heated in the DSC apparatuses, initially above the glass transition temperature $T_G$, rapidly cooled and then heated again (second heating stage). The temperature for the glass transition was taken as half the step height from the thermogram for the second heating stage.

Vicat softening temperature:

The Vicat softening temperature VST/B/120 was measured according to 150 306, DIN 53 460.

Residual ash content:

For the measurement of the residual ash content, the proportion of uncombustible mineral fillers is quantitatively determined. The residual ash content (loss on ignition) is calculated from the initial weight of the sample and the residue on ignition. The result of the measurement is expressed in ppm. A representative sample of about 1 kg is taken from the material to be tested (granules, regenerated material, etc.). The material must be clean and completely dry; predrying at about 80° C. in a forced-circulation oven may be necessary. Three empty porcelain crucibles are ignited for at least 1 h at a temperature of 650° C. in a crucible furnace, cooled to room temperature in a desiccator and then weighed with an accuracy of 0.1 mg. The ignition is repeated until weight constancy is achieved between two successive weighings. 50 g (±0.1 g) of material are then weighed into each crucible and the crucibles are placed in the muffle furnace at 650° C. The temperature in the furnace is now increased to 1000° C. and ignition is carried out at this temperature for at least 1 h. After the crucibles have been cooled in a desiccator, they are weighed with an accuracy of 0.1 mg. The ash content is expressed in ppm (parts per million) units (=mg/m$^3$). All three crucibles are evaluated according to the following formula, and the two values with the smallest difference are combined to give a mean value:

$$ppm = \frac{\text{Final weight (g)}}{\text{Sample weight (g)}} \times 1,000,000$$

Chlorine content:

The chlorine content of polyolefins is measured quantitatively by means of X-ray fluorescence analysis (XFA) according to DIN 51 001, Part 1. A pellet is produced by compressing granules/powder and is measured by XFA against a calibration curve. The calibration curve was obtained with the aid of 10 calibration samples in which the chlorine content was determined by an independent wet chemical method.

Molecular weight determination:

Three-detector gel permeation chromatography is used for determining the average molecular weight $M_w$. The substance is dissolved in a mobile phase, such as THF, and is added to a separation column. The separation column is 90 cm long and is filled with a porous carrier whose pore size is 5 μm. The detection is carried out by means of UV absorption spectroscopy at different wavelengths and by means of the refractive index and light scattering power of the fractions. Calibration is carried out using a standard compound having a known molecular weight. The comparison of the UV absorbance of the standard substance with the absorbance of the sample permits assignment of the molecular weights (DIN 55 672, Part 1).

We claim:

1. A process for the production of biaxially oriented polypropylene films which comprise at least one layer, in which a propylene polymer B is heated in an extruder and the melt of the propylene polymer B is extruded through a flat sheet die and the melt emerging from the flat sheet die is taken off on one or more rolls and is solidified to give a prefilm and this prefilm is stretched in the longitudinal and transverse direction, wherein 1. a propylene polymer or a propylene polymer mixture A is heated and melted in a second extruder and
   2. the melt of the propylene polymer or of the propylene polymer mixture A is fed to the two sides of the propylene polymer melt B in such a way that the two melts are extruded together and simultaneously through the flat sheet die, and the propylene polymer or the propylene polymer mixture A forms the edge region of the film during the production process, and
   3. the edge regions comprising the propylene polymer or the propylene polymer mixture A are cut off after the longitudinal and transverse stretching of the film.

2. The process as claimed in claim 1, wherein the propylene polymer B and the propylene polymer or the propylene polymer mixture A differ with regard to their residual ash content.

3. The process as claimed in claim 2, wherein the residual ash content of the propylene polymer or of the propylene polymer mixture A is at least twice as great as the residual ash content of the propylene polymer B.

4. The process as claimed in claim 3, wherein the propylene polymer B has a residual ash content of $\leq 70$ ppm.

5. The process as claimed in claim 1, wherein the propylene polymer B has a chlorine content of $\leq 50$ ppm.

6. The process as claimed in claim 1, wherein the propylene polymer B contains from 90 to 100% by weight of propylene units and has a melting point of 130° C. or higher and a melt flow index of from 0.5 to 10 g/10 min.

7. The process as claimed in claim 1, wherein the propylene polymer B has an average molecular weight $M_w$ in the range from 150,000 to 400,000 and $M_w/M_n$ in the range from 2 to 15.

8. The process as claimed in claim 1, wherein stabilizers or neutralizing agents are added to the propylene polymer B.

9. The process as claimed in claim 1, wherein the propylene polymer B contains no antistatic agent and no lubricant.

10. The process as claimed in claim 1, wherein the residual ash content of the propylene polymer or of the propylene polymer mixture A is from 50 to 800 ppm and the chlorine content is from 20 to 100 ppm.

11. The process as claimed in claim 1, wherein the propylene polymer or the propylene polymer mixture A contains from 90 to 100% by weight of propylene units and has a melting point of 130° C. or higher and a melt flow index of from 0.3 to 15 g/10 min.

12. The process as claimed in claim 1, wherein the propylene polymer or the propylene polymer mixture A has an average molecular weight $M_w$ of from 150,000 to 400,000 and $M_w/M_n$ of from 2 to 15.

13. The process as claimed in claim 1, wherein the propylene polymer or the propylene polymer mixture A is peroxidically degraded and the degradation factor is from 3 to 15.

14. The process as claimed in claim 1, wherein neutralizing agents or stabilizers are added to the propylene polymer or the propylene polymer mixture A.

15. The process as claimed in claim 1, wherein the melting points of the propylene polymers B and A differ from one another by not more than 15° C.

16. The process as claimed in claim 15, wherein the melt flow index of the propylene polymer or of the propylene polymer mixture A is not more than three times the melt flow index of the propylene polymer B.

17. The process as claimed in claim 1, wherein the polypropylene film has a further layer.

18. The process as claimed in claim 1, wherein the edge region of the film which is cut off in process step 3 is 300 mm during the production.

19. The process as claimed in claim 18, wherein the edge is essentially not oriented in the transverse direction.

20. The process as claimed in claim 19, wherein the edge is from 20 to 100 μm thick.

21. The process as claimed in claim 20, wherein the cutoff edge contains at least 30% by weight of the propylene polymer or of the propylene polymer mixture A.

22. The process as claimed in claim 1, wherein the polymer melts are fed with the aid of a co-extrusion die rotated through 90° C.

23. The process as claimed in claim 22, wherein the polymer melt B is fed through an eyelet die and the polymer melt or the propylene polymer mixture A is injected laterally.

* * * * *